United States Patent
Conroy et al.

(10) Patent No.: US 10,689,827 B2
(45) Date of Patent: Jun. 23, 2020

(54) SPREADER BARS AND COMPONENTS THEREFOR

(71) Applicant: 2MT MINING PRODUCTS PTY LTD, Mackay (AU)

(72) Inventors: David Garnet John Conroy, Mackay (AU); Michael John Swinscoe, Mackay (AU); Gayan Asanga Perera, Kellyville (AU)

(73) Assignee: 2MT Mining Products Pty Ltd., Mackay (AU)

( * ) Notice: Subject to any disclaimer, the term of this patent is extended or adjusted under 35 U.S.C. 154(b) by 307 days.

(21) Appl. No.: 15/441,499

(22) Filed: Feb. 24, 2017

(65) Prior Publication Data

US 2017/0241102 A1   Aug. 24, 2017

(30) Foreign Application Priority Data

Feb. 24, 2016  (AU) .................. 2016900663

(51) Int. Cl.
*E02F 3/58*   (2006.01)
*F16B 21/12*  (2006.01)

(52) U.S. Cl.
CPC .............. *E02F 3/58* (2013.01); *F16B 21/12* (2013.01)

(58) Field of Classification Search
CPC ...................................... E02F 3/58; E02F 3/60
See application file for complete search history.

(56) References Cited

U.S. PATENT DOCUMENTS

| | | | |
|---|---|---|---|
| 1,077,562 A | 11/1913 | Sage | |
| 2,092,556 A * | 9/1937 | Page | E02F 3/60 37/399 |
| 2,096,773 A * | 10/1937 | Weimer | E02F 3/48 37/396 |
| 2,904,907 A * | 9/1959 | Larsen | E02F 3/60 37/399 |
| 3,247,606 A * | 4/1966 | Page | E02F 3/58 37/398 |
| 3,531,088 A | 9/1970 | Kraschnewski | |
| 4,397,493 A * | 8/1983 | Khachaturian | B66C 1/12 294/81.1 |
| 5,343,641 A | 9/1994 | Gregory | |
| 5,345,702 A * | 9/1994 | Hughes | E02F 3/60 37/394 |
| 5,657,559 A * | 8/1997 | Immel | E02F 3/58 294/68.27 |
| 6,296,288 B1 | 10/2001 | Khachaturian | |
| 6,581,995 B1 * | 6/2003 | Zaayman | B66C 1/12 294/68.3 |

(Continued)

*Primary Examiner* — Jessica H Lutz
(74) *Attorney, Agent, or Firm* — Abelman, Frayne & Schwab

(57) ABSTRACT

A spreader bar including two spaced apart opposite end portions, each end portion having a first connection point for connecting a lower hoist chain thereto and a second connection point for connecting an upper hoist chain thereto, said second connection point being spaced from said first connection point towards the opposite end portion by a first predetermined distance, said predetermined distance being selected such that in use an upper hoist chain connected thereto makes a smaller angle with the longitudinal axis of the spreader bar than would an upper hoist chain connected to the first connection point.

15 Claims, 15 Drawing Sheets

(56) References Cited

U.S. PATENT DOCUMENTS

| | | |
|---|---|---|
| 7,967,352 B2 | 6/2011 | DiMartino |
| 8,382,175 B2 | 2/2013 | DiMartino |
| 2004/0060203 A1* | 4/2004 | Briscoe ................ E02F 3/58 37/307 |
| 2009/0183397 A1* | 7/2009 | Kubo .................. E02F 3/60 37/399 |
| 2011/0110708 A1* | 5/2011 | Miotke ................ E02F 3/58 403/64 |

* cited by examiner

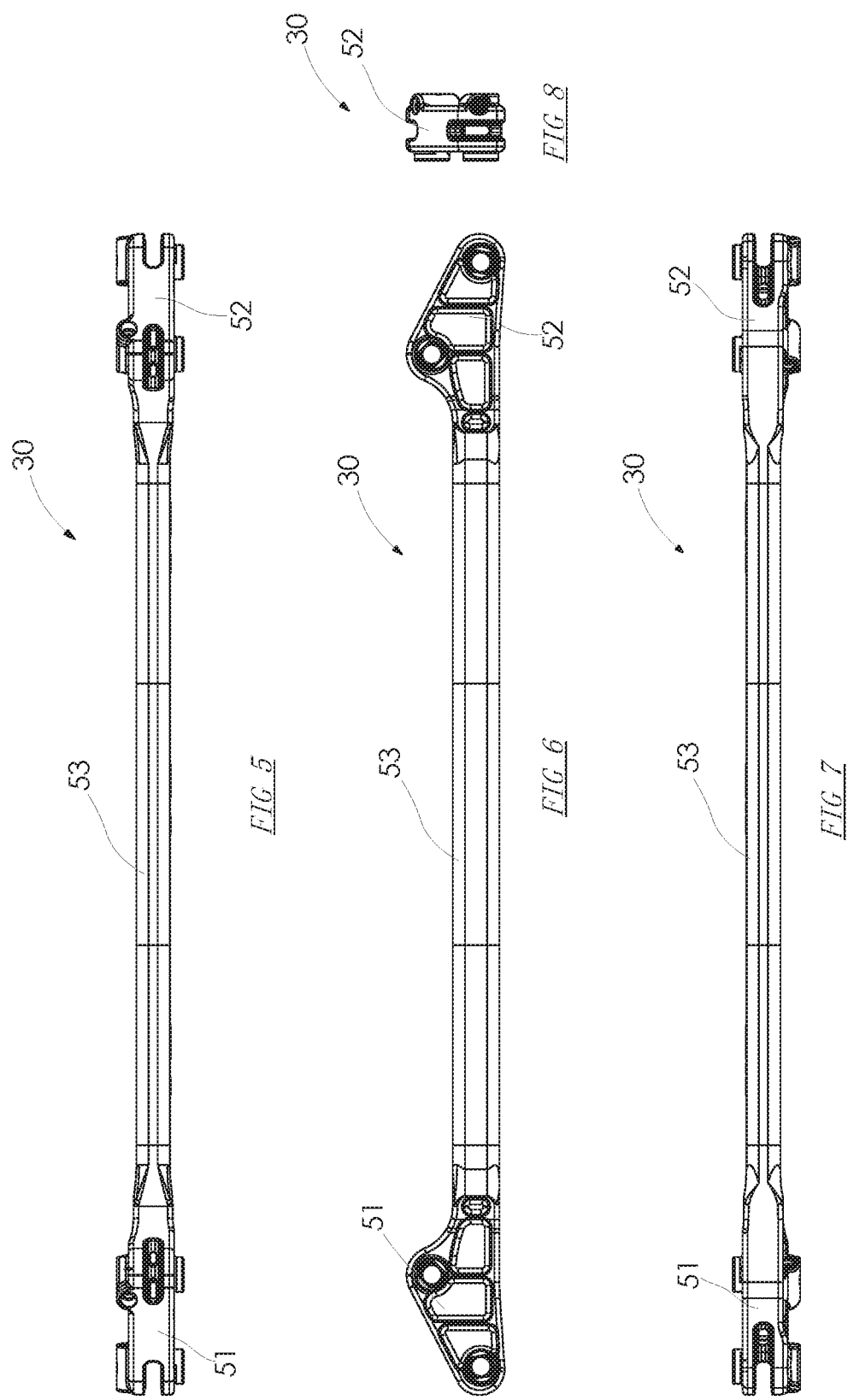

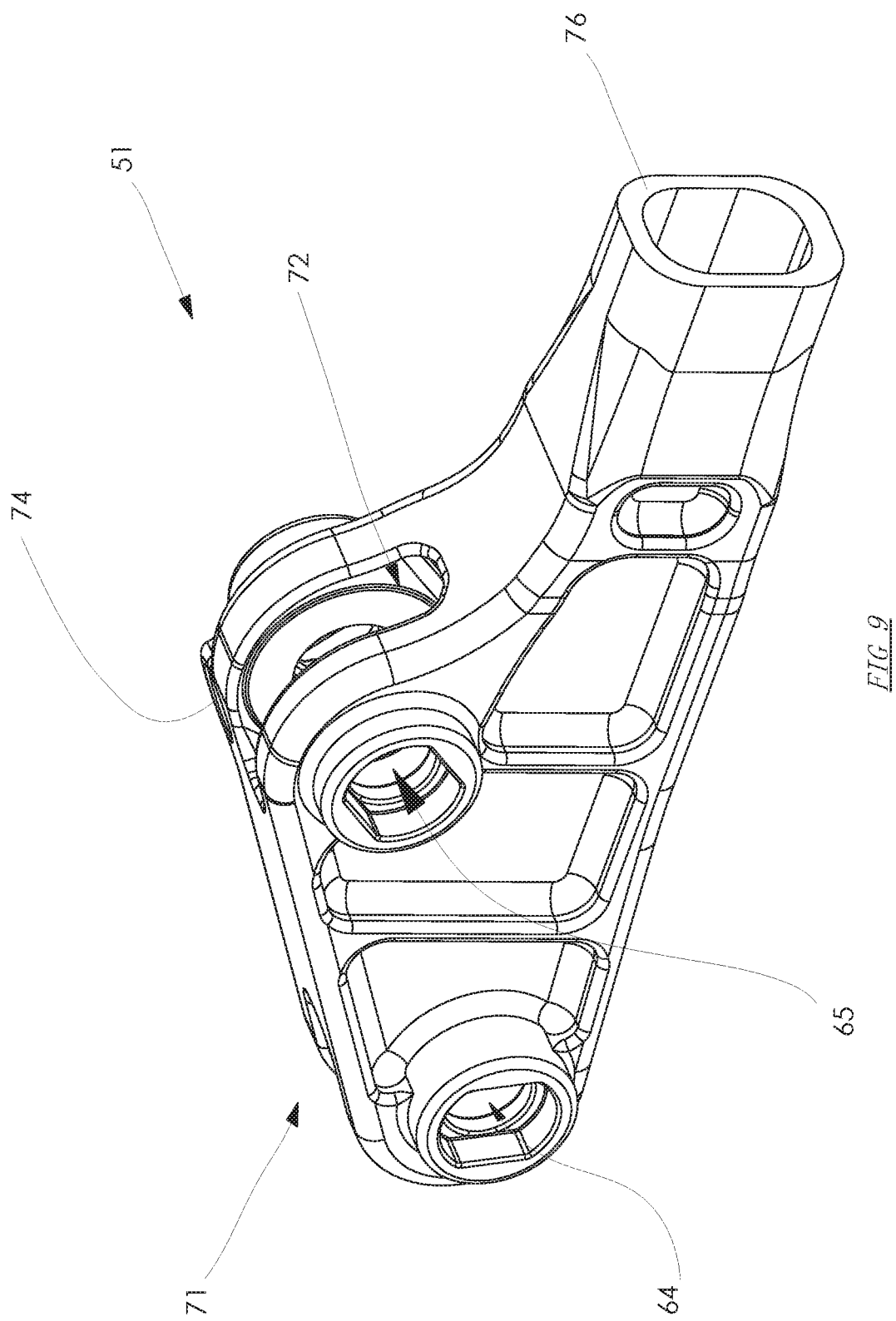

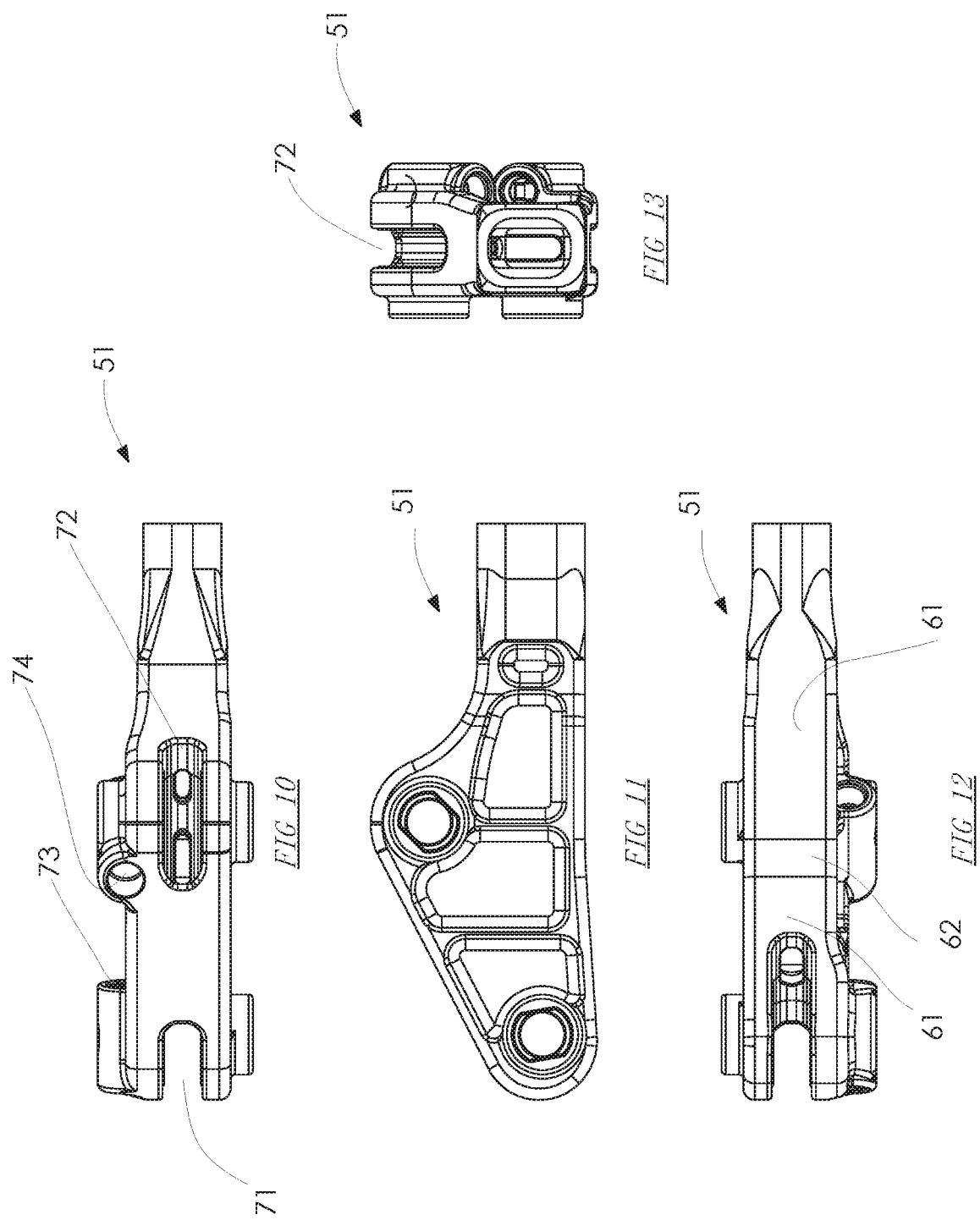

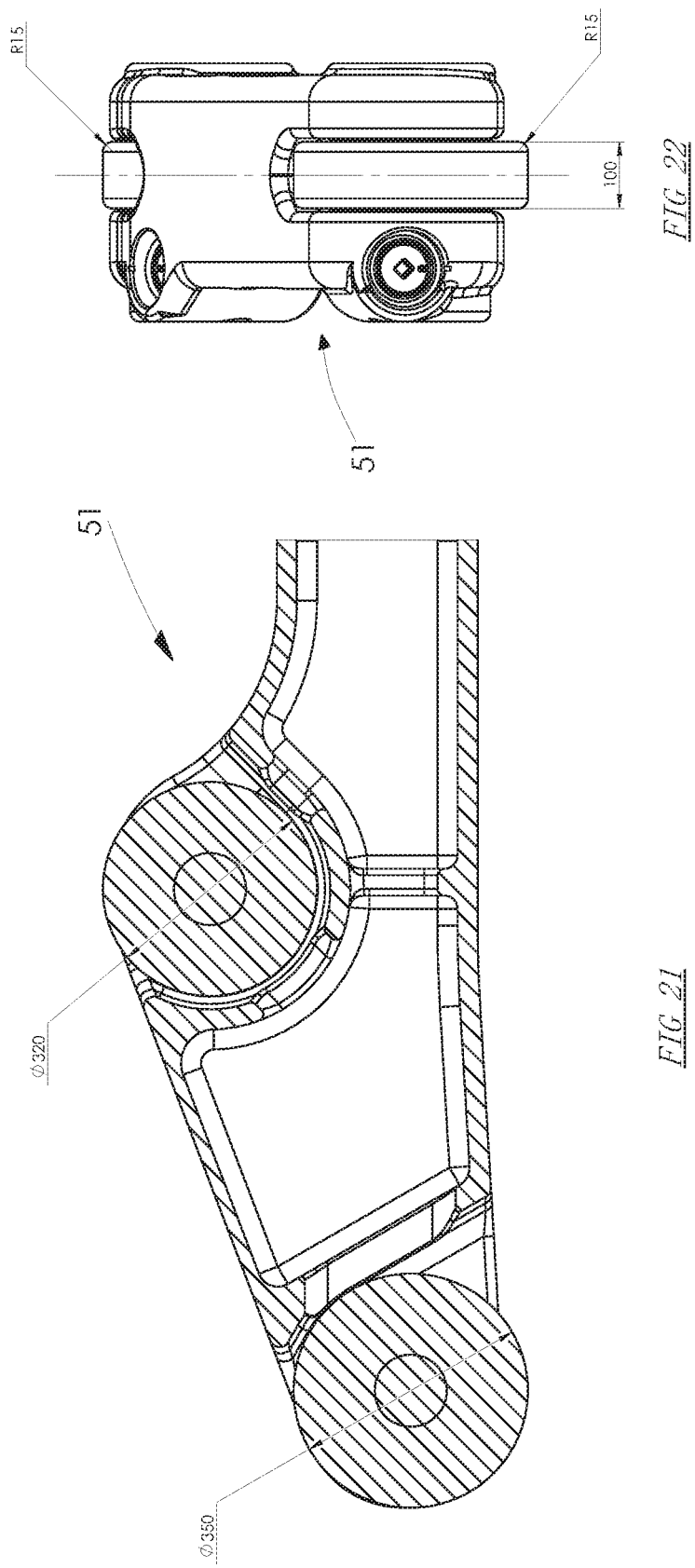

SPREADER BARS AND COMPONENTS THEREFOR

CROSS REFERENCE TO RELATED APPLICATION

This patent application claims the benefit of Australian Application number 2016900663, filed 24 Feb. 2016, the content of which is incorporated by reference herein in its entirety.

FIELD OF THE INVENTION

This invention relates to spreader bars and components therefor. The invention has particular application to spreader bars for use in lifting dragline buckets and specific reference will be made to such application. However, the invention also may have application to spreader bars in general, for example, spreader bars used for lifting shipping containers or other heavy loads.

BACKGROUND OF THE INVENTION

Dragline buckets or bucket assemblies typically comprise a bucket with a base or bottom wall, two opposed side walls or side wall portions extending upwardly from the base to define a front opening and a rear wall also extending upwards from the base. A plurality of forward projecting teeth generally extends from a lip at the front of the base for the purpose of digging. Some buckets have an arch over the front opening for the purpose of connecting a dump cable thereto for tilting the bucket. Typically, trunnions or some other suitable connecting means extend outwards from the side walls of the bucket behind the center of gravity for the connection of hoist chains which extend upwards and inwards to a point above the bucket where they connect to a lifting cable via various rigging components.

Generally, a spreader bar extends between the hoist chains a short distance above the top of the bucket so as to hold the chains away from the outer faces of the side walls against the force applied to the chain by the lifting cable thereby inhibiting engagement of the chains with the side walls. In some cases, each hoist chain has a lower part extending from the trunnion to the spreader bar and an upper part extending from the spreader bar to the lifting cable. The lower part of each hoist chain is typically referred to as the lower hoist chain and the upper part, the upper hoist chain. In some cases the upper and lower parts are separate chains.

In use, dragline buckets are often dropped from significant heights which can result in the spreader bar hitting the upper edge of the bucket and damaging the spreader bar. Sometimes, in the normal course of operation the spreader bar can drop a short distance onto the upper edge of the bucket and still cause damage. Further, dragline buckets have been increasing in size in recent years putting greater loads on the spreader bars with greater widths requiring longer spreader bars. The failure of a spreader bar results in significant downtime resulting in loss of production.

SUMMARY OF THE INVENTION

The present invention is aimed at providing spreader bars and components therefor which can better accommodate or tolerate the forces applied when dropped onto the upper edge of a bucket or any other load. The invention is also aimed at providing spreader bars which can carry the increased loads resulting from the larger buckets without a proportionate increase in spreader bar weight.

With the foregoing in view, the present invention resides broadly in a spreader bar including:

two spaced apart opposite end portions, each end portion having a first connection point for connecting a lower hoist chain thereto and a second connection point for connecting an upper hoist chain thereto, said second connection point being spaced from said first connection point towards the opposite end portion by a predetermined distance, said predetermined distance being selected such that in use an upper hoist chain connected thereto makes a larger enclosed angle with the longitudinal axis of the spreader bar than would an upper hoist chain connected to the first connection point.

In another aspect, the invention resides broadly in a spreader bar including:

two spaced apart opposite end portions, each end portion having a first connection point for connecting a lower hoist chain thereto and a second connection point for connecting an upper hoist chain thereto, said second connection point being spaced from said first connection point towards the opposite end portion by a predetermined distance and said first and second connection points being on a line which makes an angle of between about 10 degrees and about 45 degrees to the longitudinal axis of the spreader bar.

In another aspect, the invention resides broadly in a spreader bar including:

two spaced apart opposite end portions, each end portion having one or more connection points for connecting a lower hoist chain and an upper hoist chain thereto, said end portions having a predetermined length, said predetermined length being determined by reference to the width of the bucket to which the spreader bar is to be attached whereby in use the distance between said first and second end portions is less than the width of the top opening of the bucket such that in use, in the event of the spreader bar falling onto the bucket, the two spaced apart end pieces will likely engage the respective upper edges of the side walls of the bucket.

Preferably each end portion has a lower face which is substantially flat over at least the portion which is likely to engage an upper edge of a sidewall of the bucket in the event of the spreader bar falling onto the bucket. Thus, in such form it will appreciated that it is preferred that the centres of the first and second connection points are each above the lower face of the spreader bar whereby damage to the connection points is avoided.

In another aspect, the invention resides broadly in a spreader bar including:

two spaced apart opposite end portions, each end portion having a first connection point for connecting a lower hoist chain thereto and a second connection point for connecting an upper hoist chain thereto, said first and second connection points being on a line which makes an angle of between about 10 degrees and about 45 degrees to the longitudinal axis of the spreader bar; and said second connection point being spaced from said first connection point towards the opposite end portion by a predetermined distance, said predetermined distance being selected such that in use an upper hoist chain connected thereto makes a larger angle with the longitudinal axis of the spreader bar than would an upper hoist chain connected to the first connection point; and said end portions having a predetermined length determined by reference to the width of the bucket to which the spreader bar is to be attached whereby the distance between said first and second end portions is less than the width of the upper opening of the bucket such that in use in the event of the spreader bar falling onto the bucket, the two spaced apart end pieces will engage the respective upper edges of the side walls of the bucket. Preferably, said angle of the line is between about 10 degrees and about 30 degrees.

Preferably, the centre of the first and second connection points are each above the lower face of the spreader bar. Apart from the advantage of such arrangement allowing the lower face to be relatively flat at least in the region of likely contact with the upper edge of the bucket to which it is to be connected, it also allows the height of the end portions to be reduced.

Advantageously, spacing the second connection point inwards from the first connection point reduces the span of the spreader bar between the two second connection points thereby allowing a lighter bar to be used between those two points for the load to be carried.

The possible area of contact of the spreader bar with the upper edge of the bucket (the contact length) depends on a number of factors including the ratio of spreader bar length to bucket width at the upper edge of the side walls above the lifting trunnions and the length of the lower hoist chains, the length of the lower hoist chains between the upper edges of the bucket, and whether the lower hoist chains are taut or slack at the time of dropping. In that respect, it has been found that in most cases the spreader bar hits the upper edge of the bucket within about 100 mm of the direct drop position, that is, the position where the bar is equidistant on both sides of the bucket, that is to say, the point of engagement falls within a span of about 200 mm. Thus, it is preferred that the length of the end portions be selected such that the length of the spreader bar between the end portions is at least 200 mm less than the width of the bucket. Further, it is preferred that the end pieces have a relatively flat bottom face over at least the contact length.

In yet another aspect the invention resides broadly in an end piece for a spreader bar having an outer end and an inner end, said inner end being adapted to be welded to another like end portion or one or more connected intermediate connector portions to form a spreader bar, said end piece having a first connection point for connecting a lower hoist chain thereto and a second connection point for connecting an upper hoist chain thereto, said second connection point being spaced from said first connection point by a predetermined distance selected such that in use an upper hoist chain connected thereat makes a smaller angle with the longitudinal axis of the spreader bar than would an upper hoist chain connected at the first connection point.

In another aspect, the invention resides broadly in an end piece for a spreader bar having an outer end and an inner end, said inner end being adapted to be welded to another like end portion or one or more intermediate connector portions to form a spreader bar, said end piece having a first connection point for connecting a lower hoist chain thereto and a second connection point for connecting an upper hoist chain thereto, said second connection point being spaced from said first connection point towards the inner end by a predetermined distance and said first and second connection points being on a line which in use makes an angle of between about 10 degrees and about 45 degrees to the longitudinal axis of the spreader bar.

Preferably, said angle is between about 10 degrees and about 30 degrees.

In another aspect, the invention resides broadly in an end piece for a spreader bar having an outer end and an inner end, said inner end being adapted to be welded to another like end portion or one or more intermediate connector portions to form a spreader bar, said end piece having one or more connection points for connecting a lower hoist chain and an upper hoist chain thereto, the distance from the connection point for the lower hoist chain to the inner end being greater than the distance from the lower hoist chain connection point to the inner face of the bucket with which the spreader bar is to be connected. Preferably, the distance from the connection point for the lower hoist chain to the inner end is greater than the distance from the lower hoist chain connection point to the inner face of the bucket with which the spreader bar is to be connected by at least 100 mm and more preferably at least 200 mm and still more preferably at least 300 mm thereby increasing the likelihood than a falling spreader bar having end pieces according to the invention will engage the upper edge of the bucket on its bottom face.

Preferably, the end piece is constructed of a material having high tensile strength, high yield strength and high hardness. Advantageously, an end piece according to the present invention made of cast steel suitably resists plastic deformation and has high impact strength.

It is also preferred that the intermediate portion or portions also be made of the same material or similar materials.

In another aspect the invention resides broadly in a cast tube for use in constructing a spreader bar, the tube being formed by a wall defining an elongate hollow, said wall comprising a lower wall portion, two spaced apart side wall portions extending from said lower wall portion and continuous therewith and an upper wall portion spaced from said lower wall portion and contiguous therewith, said tube being generally symmetrical about a horizontal plane, a vertical plane, and two orthogonal diagonal planes through the tube, the wall increasing in thickness away from said vertical plane on both sides thereof towards said diagonal planes and decreasing in thickness from said diagonal planes towards said horizontal plane, the wall being thicker about the vertical plane through the bottom wall portion than through the upper wall portion and the upper wall portion being thicker about the vertical plane than the side walls about the horizontal plane and thicker about the diagonal planes between the bottom wall portion and the side wall portions than between the upper wall portion and the side wall portions, and the outer face of the portions of the wall about the diagonal planes being curved.

Preferably, the lower wall portion of the tube is of generally constant thickness for a predetermined distance on both sides of the vertical plane and then increase in thickness through to the diagonal plane. In a preferred form the predetermined distance is from the vertical plane to the points or lines at which the outer face begins to curve around to meet the outer face of the side walls. Similarly it is preferred that the upper wall be of generally constant thickness for a predetermined distance on both sides of the vertical plane and then increase in thickness and likewise it is preferred that the predetermined distance is from the vertical plane to the points or lines at which the outer face begins to curve around to meet the outer face of the side walls.

Preferably, the side wall portions of the tube are of generally constant thickness for a predetermined distance on both sides of the horizontal plane and then increase in thickness through to the diagonal plane. In a preferred form the predetermined distance is from the horizontal plane to the points or lines at which the outer face of the respective side walls begins to curve around to meet the outer face of the lower wall portion and the upper wall portion respectively.

In yet another aspect, the invention resides broadly in a method of constructing a spreader bar including;

determining the maximum volume of the bucket with which the spreader bar is to be used;

determining the mass of material which to be loaded into the bucket by reference to the calculated volume and the material to be loaded;

determining the width of the bucket at the upper edge;

determining the lower hoist chain angle by reference to the width of the bucket at the upper edge and the width at the trunnions;

determining the length of the spreader bar to be used by reference to the width of the bucket and the lower hoist chain angle.

It is to be understood that terms such as "horizontal", "vertical", "upper", "lower", and similar orientation terms are used herein to refer to the spreader bar described herein and various components thereof and is not intended to limit the invention to any particular orientation.

BRIEF DESCRIPTION OF THE DRAWINGS

In order that the invention may be more clearly understood and put into practical effect, reference will now be made to the accompanying drawings wherein:

FIG. 5 is a top plan view of the spreader bar of FIG. 3;

FIG. 6 is a front elevation of the spreader bar of FIG. 3;

FIG. 7 is a bottom plan view of the spreader bar of FIG. 3;

FIG. 8 is an end elevation of the spreader bar of FIG. 3;

FIG. 9 is an isometric view of the left-hand end piece of the spreader bar of FIG. 3;

FIG. 10 is a top plan view of the left-hand end piece of FIG. 9;

FIG. 11 is a front elevation of the left-hand end piece of FIG. 9,

FIG. 12 is a bottom plan view of the left-hand end piece of FIG. 9;

FIG. 13 is an end elevation of the left-hand end piece of FIG. 9;

FIGS. 17 to 21 are vertical cross sections through the left-hand end piece of FIG. 9 showing hoist chain end connectors in different positions or arrangements; and FIG. 22 is an end elevation of the left-hand end piece shown in FIG. 21.

DETAILED DESCRIPTION OF THE INVENTION

Figure 1:
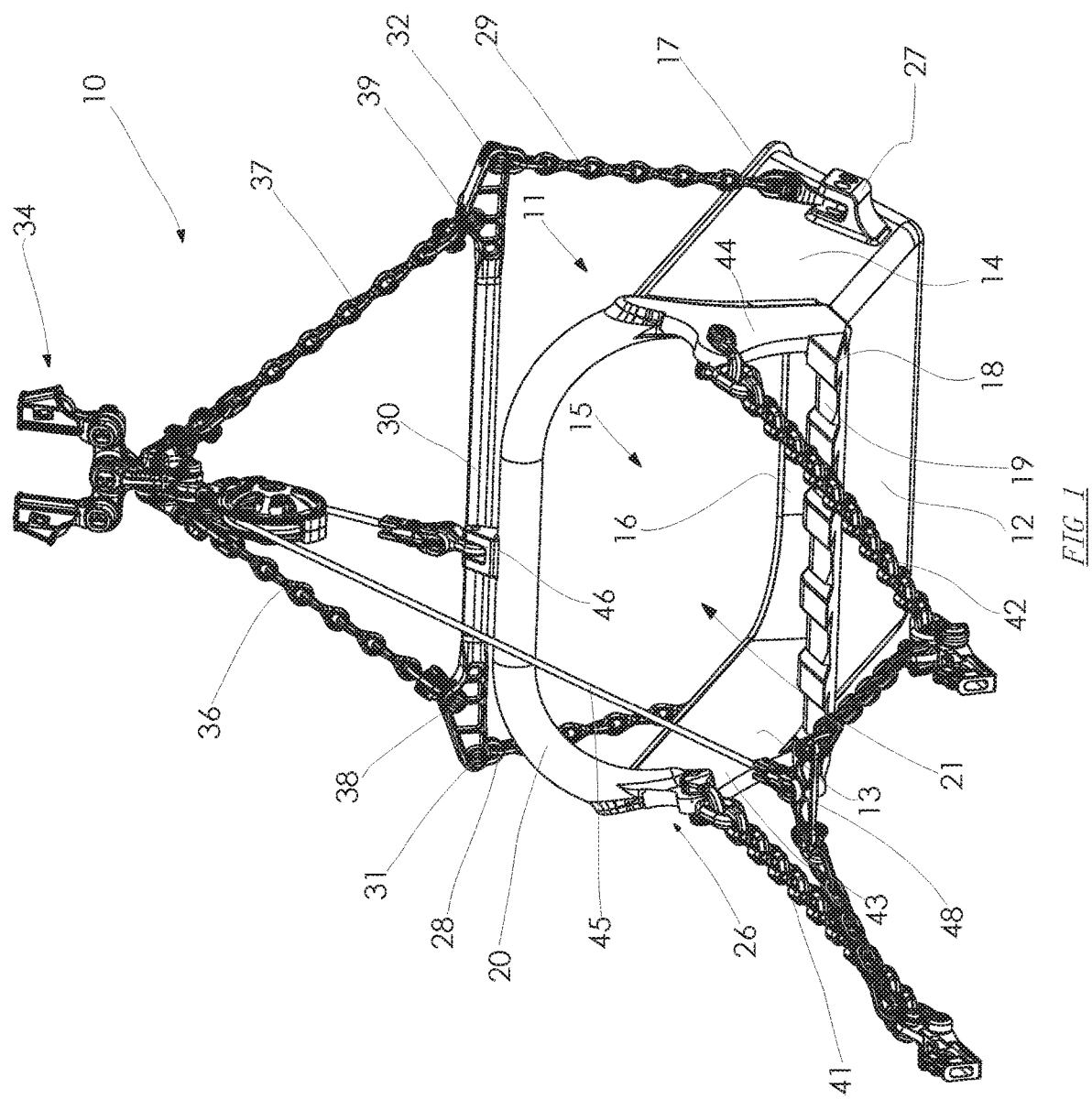
FIG. 1 is a pictorial representation of a dragline bucket assembly in position ready for use.
Figure 2:
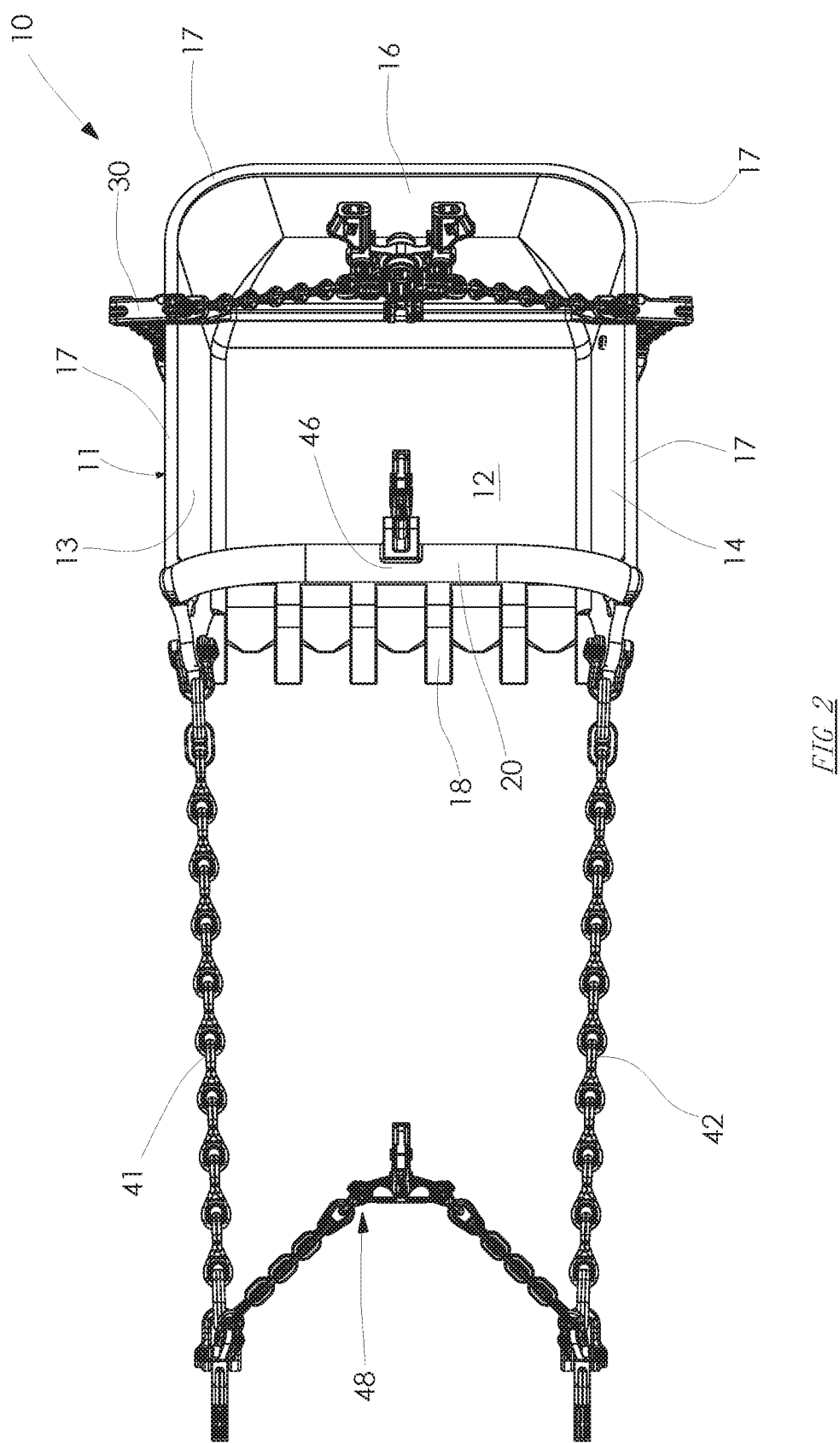
FIG. 2 is a plan view of the dragline bucket assembly of FIG. 1 with some components removed.
Figure 3:
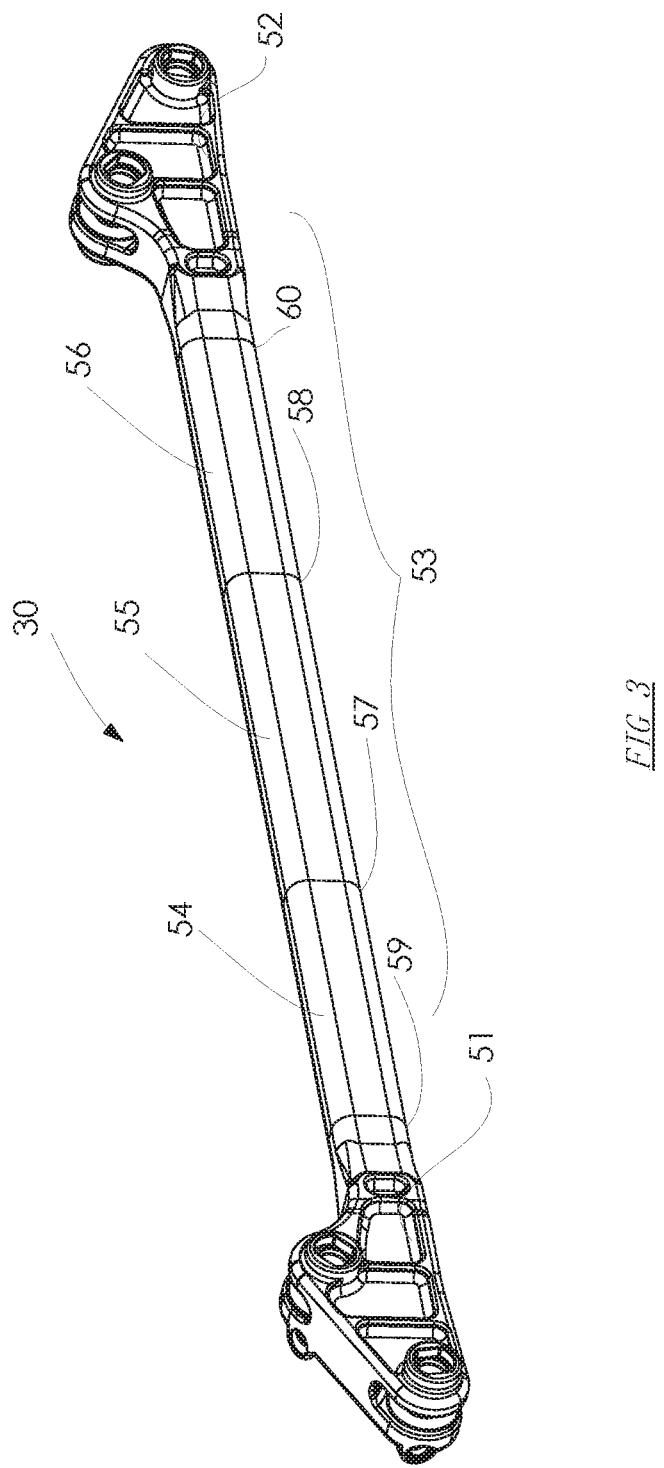
FIG. 3 is an isometric view of the spreader bar which is used in the dragline bucket assembly of FIG. 1 from one side.
Figure 4:
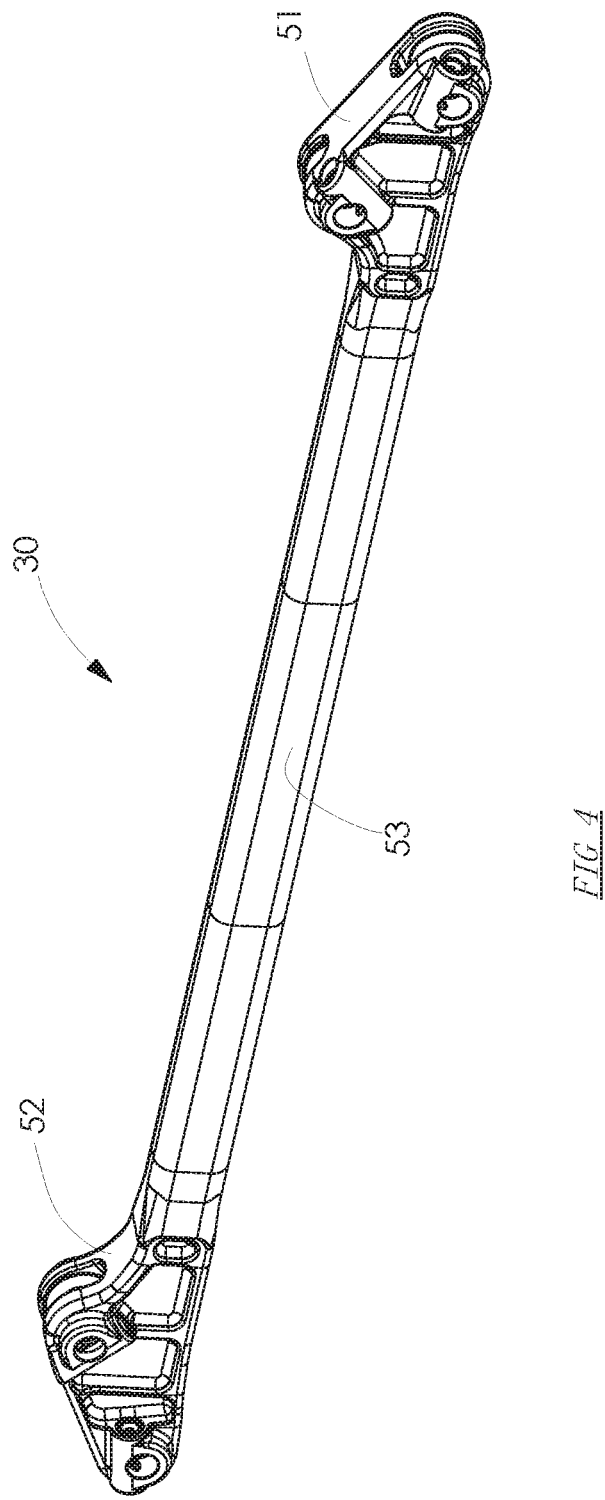
FIG. 4 is an isometric view of the spreader bar of FIG. 3 from the other side.

The dragline bucket assembly 10 illustrated in FIG. 1 includes a bucket 11 having a bottom wall 12, two spaced apart side walls 13 and 14 and a rear wall 16 which curves forwardly to join the two spaced apart side walls and the bottom wall 12, the side walls and the rear wall terminating at their upper extremity in a continuous upper edge 17 defining an upward facing opening 15. A plurality of spaced apart digging teeth 18 project forwardly from a lip 19 provided at the front edge of the bottom wall and an arch 20 extends across the front of the bucket joining the two side walls above the front edge to provide a front opening 21 therebetween.

Trunnions 26 and 27 extend outwards (sideways) from the side walls 26 and 27 respectively to which lower hoist chains 28 and 29 are attached at their lower ends. The upper ends of the lower hoist chains are held apart by a spreader bar 30 which is connected thereto by rigging pins 31 and 32 via chain end connectors 31a and 32a which are releasably mounted in the respective end pieces of the spreader bar as will be described in more detail later. The spreader bar in turn is connected to an upper rigging assembly 34 by upper hoist chains 36 and 37 respectively which connect to the spreader bar at their lower ends by pins 38 and 39 respectively via chain end connectors 36a and 37a.

Drag chains 41 and 42 are connected to drag mounts 43 and 44 respectively at the front of the side walls and drag cables (not shown) are connected to the drag chains in known manner while a tilt cable 45 is connected to the arch 20 at its midpoint 46 in known manner at one end and to the drag chains at the other end via additional rigging 48 also in known manner.

As can be seen in FIGS. 3 to 14, the spreader bar 30 comprises two spaced apart end pieces 51 and 52 (which are mirror images of each other) and a connecting tube 53 joining the two end pieces, the connecting tube comprising three short lengths of tube 54, 55 and 56 which are welded together at lines 57 and 58 with the end pieces 54 and 56 being welded to the respective end pieces 51 and 52 at lines 59 and 60.

The end pieces 51 and 52 each have a generally flat bottom face 61 although there is a slight "bend" in the bottom face approximately at line 62 so that the outermost section 61a of the bottom face is inclined downwards and outwards which assists in centering the spreader bar on the upper edge 17. Advantageously, the flat face provides an increased surface area for dispersing impact loads when the end piece hits the upper edge of the bucket.

Two spaced apart passages 64 and 65 are provided in the end piece, the outermost passage 64 being arranged to receive rigging pin 31 for connecting the lower hoist chain 28 thereto and passage 65 being arranged to receive rigging pin 38 for connecting the upper hoist chain 36 thereto as can be seen in FIG. 1. For that purpose a recess or cavity 71 is provided in the end piece which splits the passage 64 so that pin 31 may engage the top link of the lower hoist chain in the cavity and mount on opposite sides. A similar cavity 72 extends about passage 65 for receiving the lowermost link of the upper hoist chain for connection to the upper rigging pin 38. The rigging pins are secured in the passages 31 and 38 respectively by the locking pins (not shown) which engage in locking pin passages 73 and 74 and are secured therein by a locking member as described in the present applicant's earlier application No. PCT/AU2015/000460 although other locking pin assemblies would be suitable.

Figure 14:
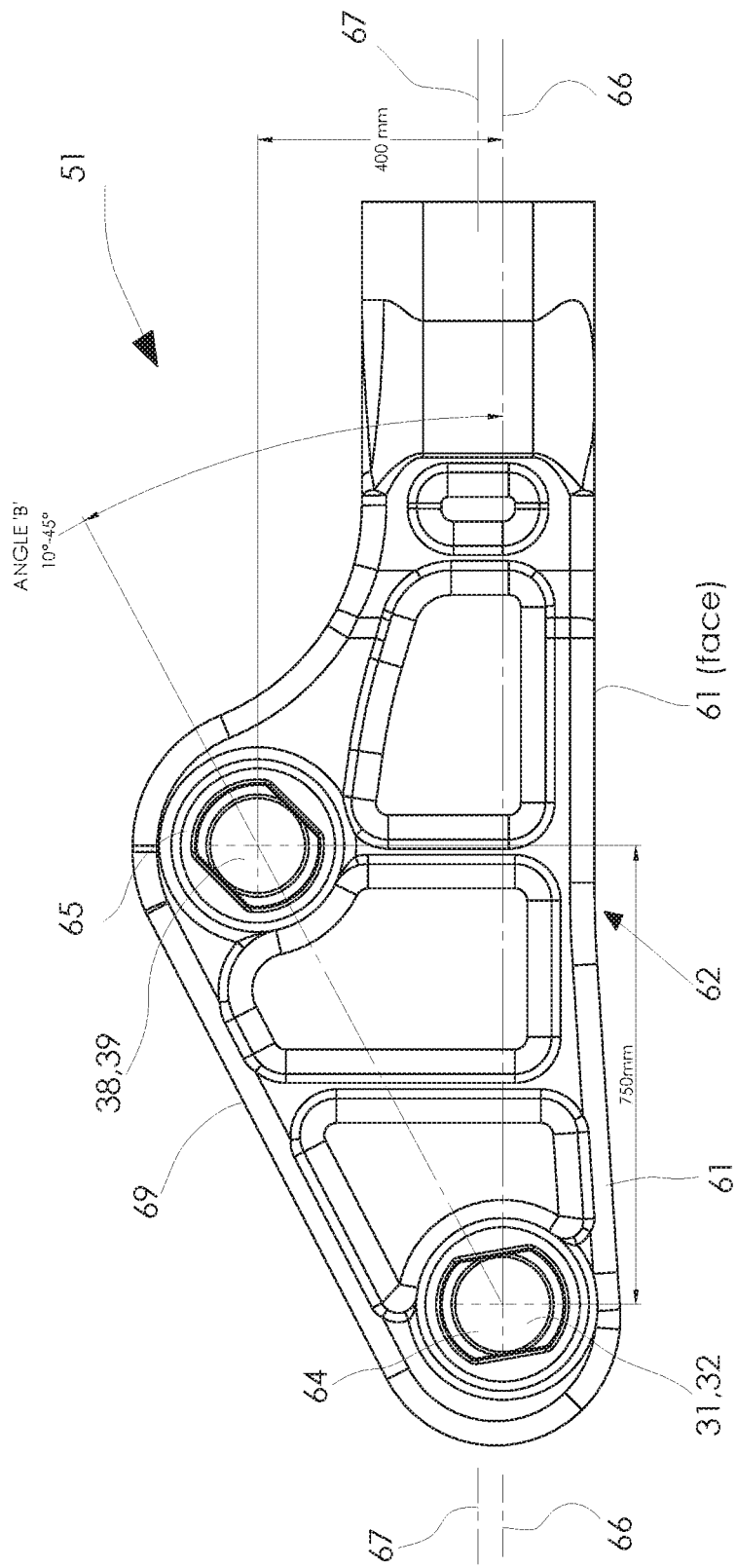
FIG. 14 is an enlarged front elevation of the left-hand end piece of FIG. 9.

The inclined bottom face allows the outermost passage 64 to be positioned lower in the end piece then would be the case without the inclined section. As can be seen in FIG. 14, a horizontal line passing through the centre of passage 64 (and pin 31 therein) is lower than centre line 67 passing through the centre of connecting tube 53 (which will be described in more detail later) thereby providing better performance for the spreader bar as a whole.

FIG. 14 shows that passage 65 is spaced horizontally from passage 64 by a distance of 750 mm and is also spaced vertically from passage 64 by a distance of 400 mm in this case in which the passages 64 and 65 are designed to take 6 inch diameter pins. The length of each space (horizontal and vertical) is selected to achieve a specified angle "B" to the horizontal for a line passing through the two pin passages as can be seen in FIG. 14 depending on the bucket and material with which the spreader bar is to be used. It will be appreciated that the horizontal spacing of 750 mm (or whatever the case may be) results in the length of the spreader bar between the vertical plane containing the centre of passage 65 where the upper voice chain is connected is significantly less than it would be if the two passages were aligned vertically as is the case in many presently known spreader bars, thereby reducing the free span of the spreader bar between the upper switched chains. It will also be appreciated that increasing or decreasing die vertical spacing and/or the horizontal spacing can increase or decrease angle B with the inclined upper face 69 of the end piece following to increase or decrease the load bearing capacity of the end piece as required. As can be seen in FIG. 14, the preferred range for angle B is from about 10° to about 45° although there are optimum angles within that range for specific circumstances. A more preferred range of angles is between about 10 degrees and about 30 degrees because the height of the spreader bar from the lower surface to the top of the end piece is more appropriate and the bar is more balanced against rotation about its longitudinal axis.

Figure 15:
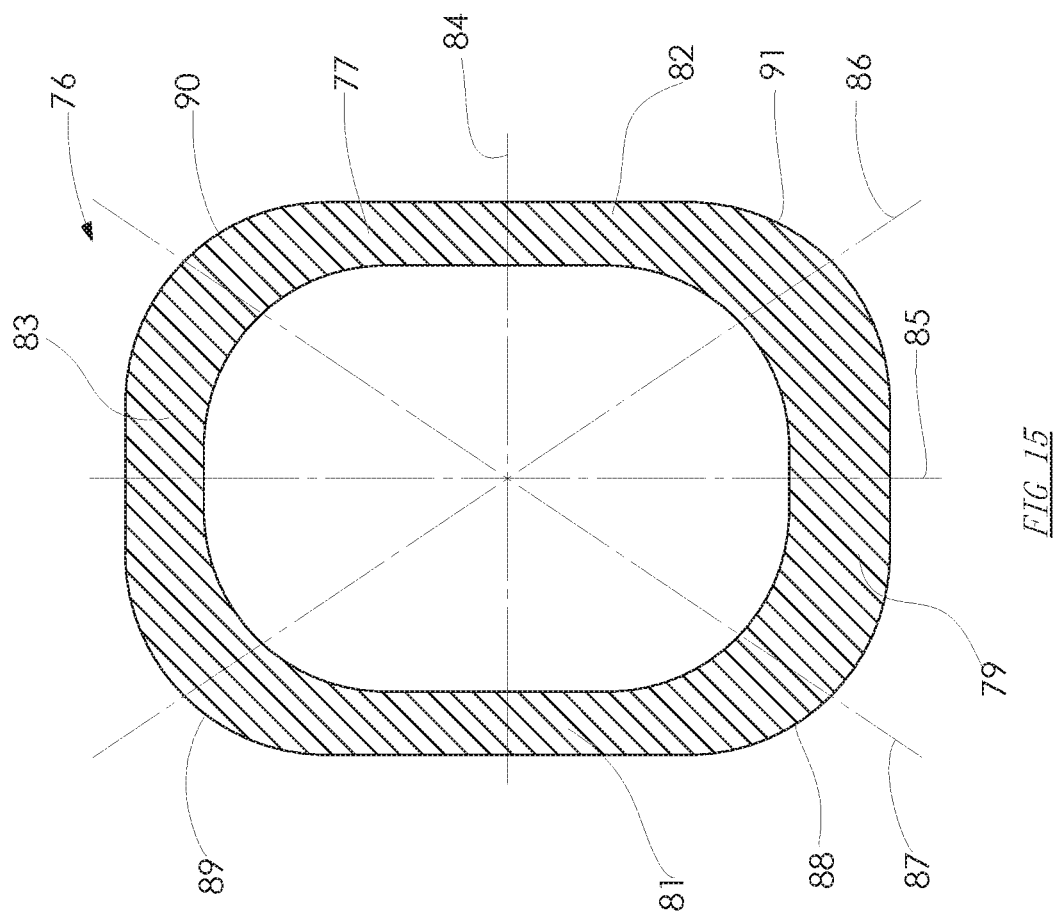
FIG. 15 is an end elevation of the right-hand end of the left-hand end piece of FIG. 9.
Figure 16:
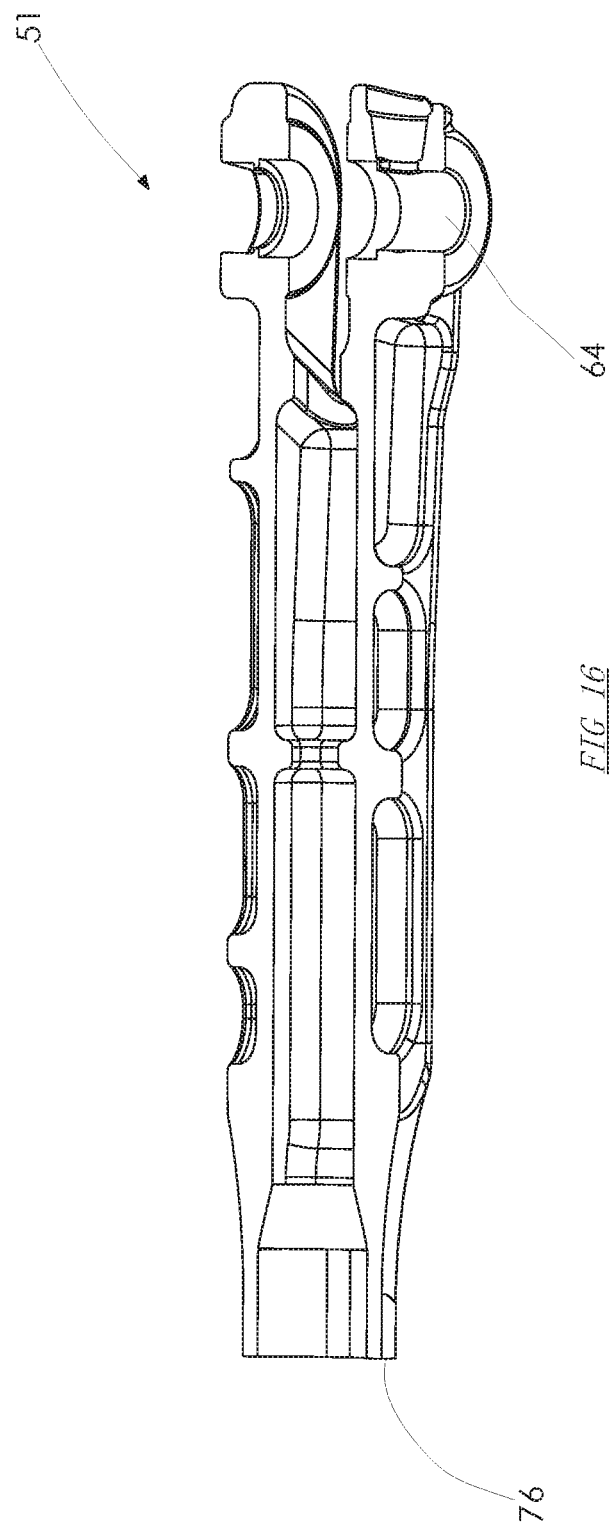
FIG. 16 is a horizontal sectional pictorial view of the left-hand end piece of FIG. 9 showing wall thickness and that the end piece is generally hollow.
Figure 17:
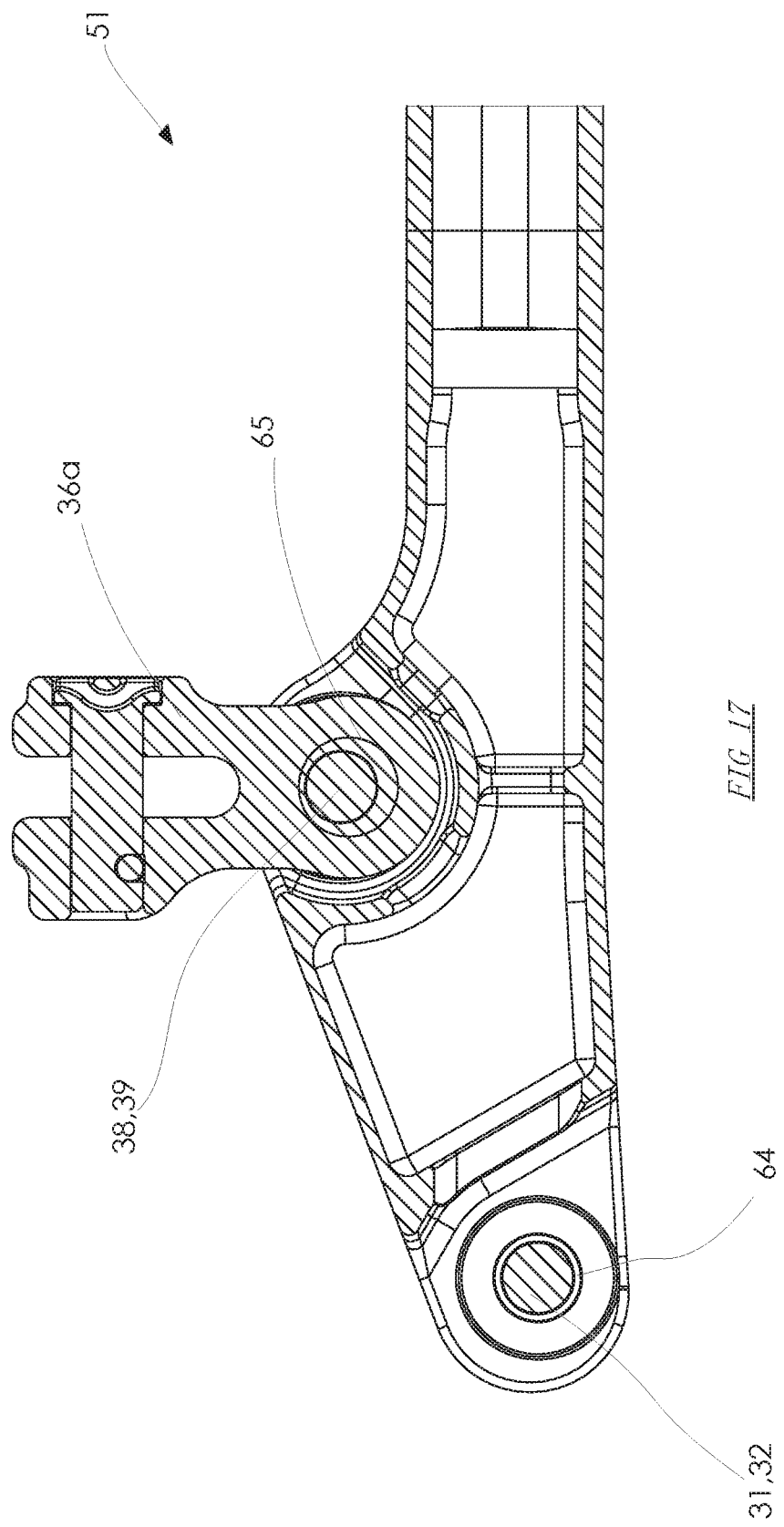
Figure 18:
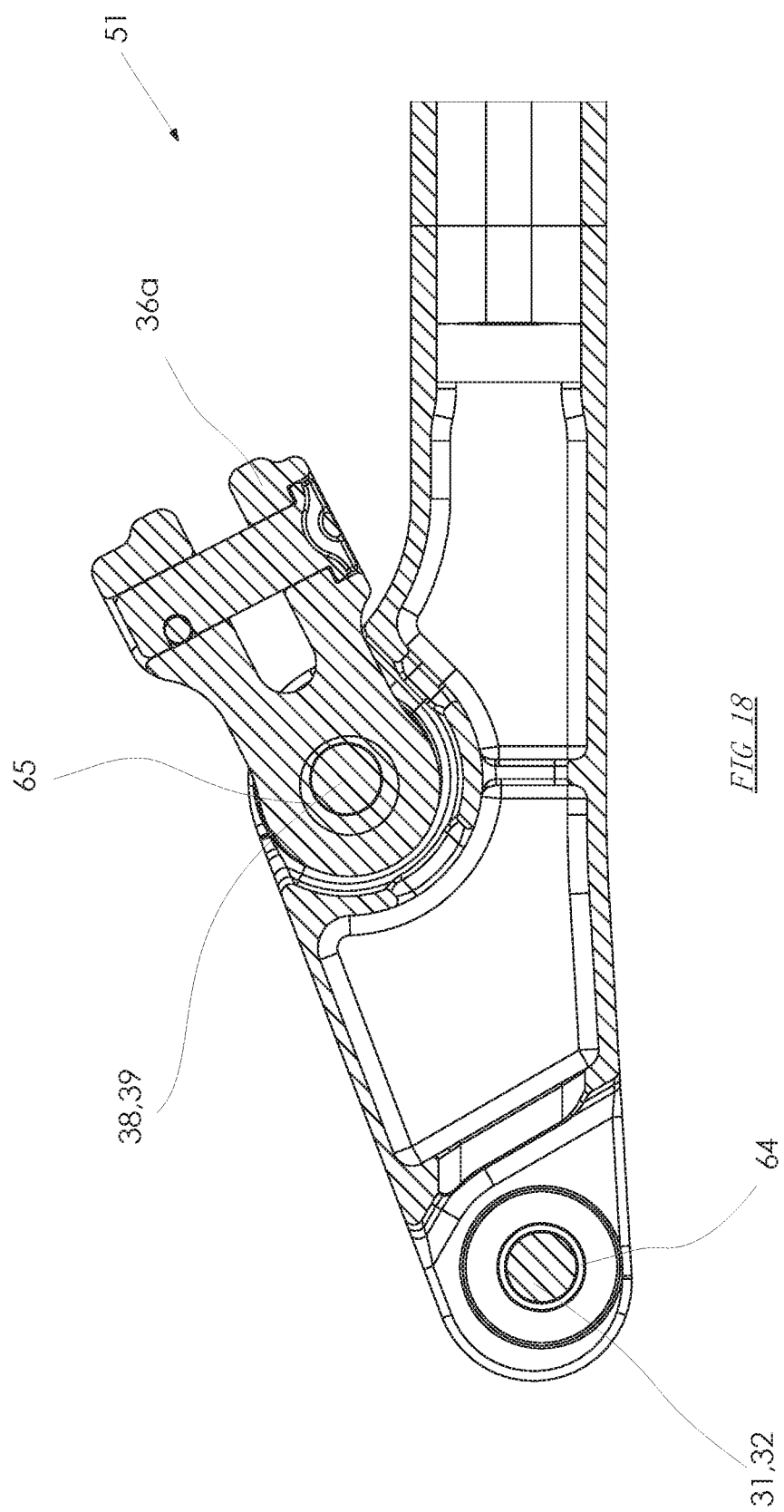
Figure 19:
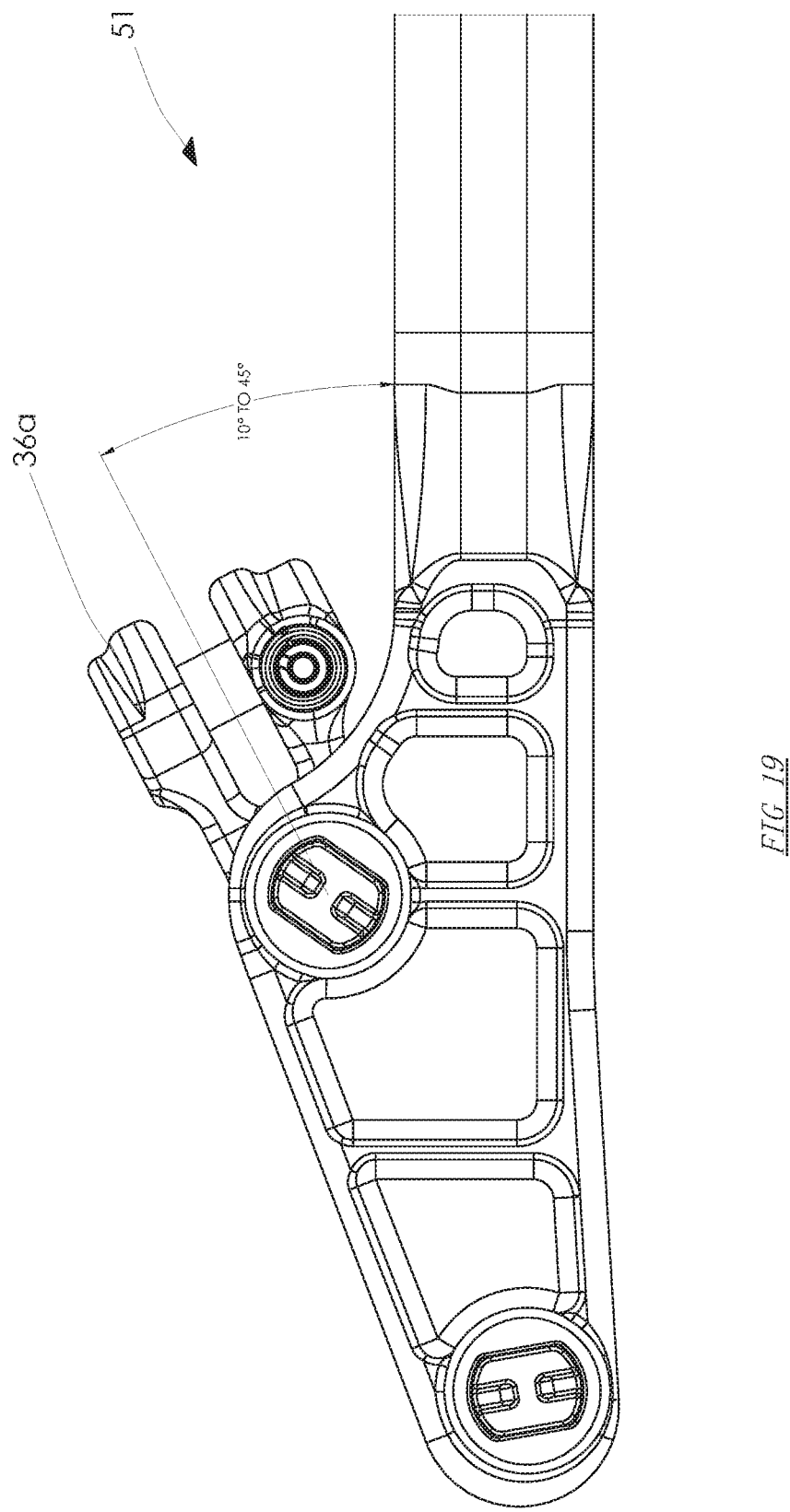
Figure 20:
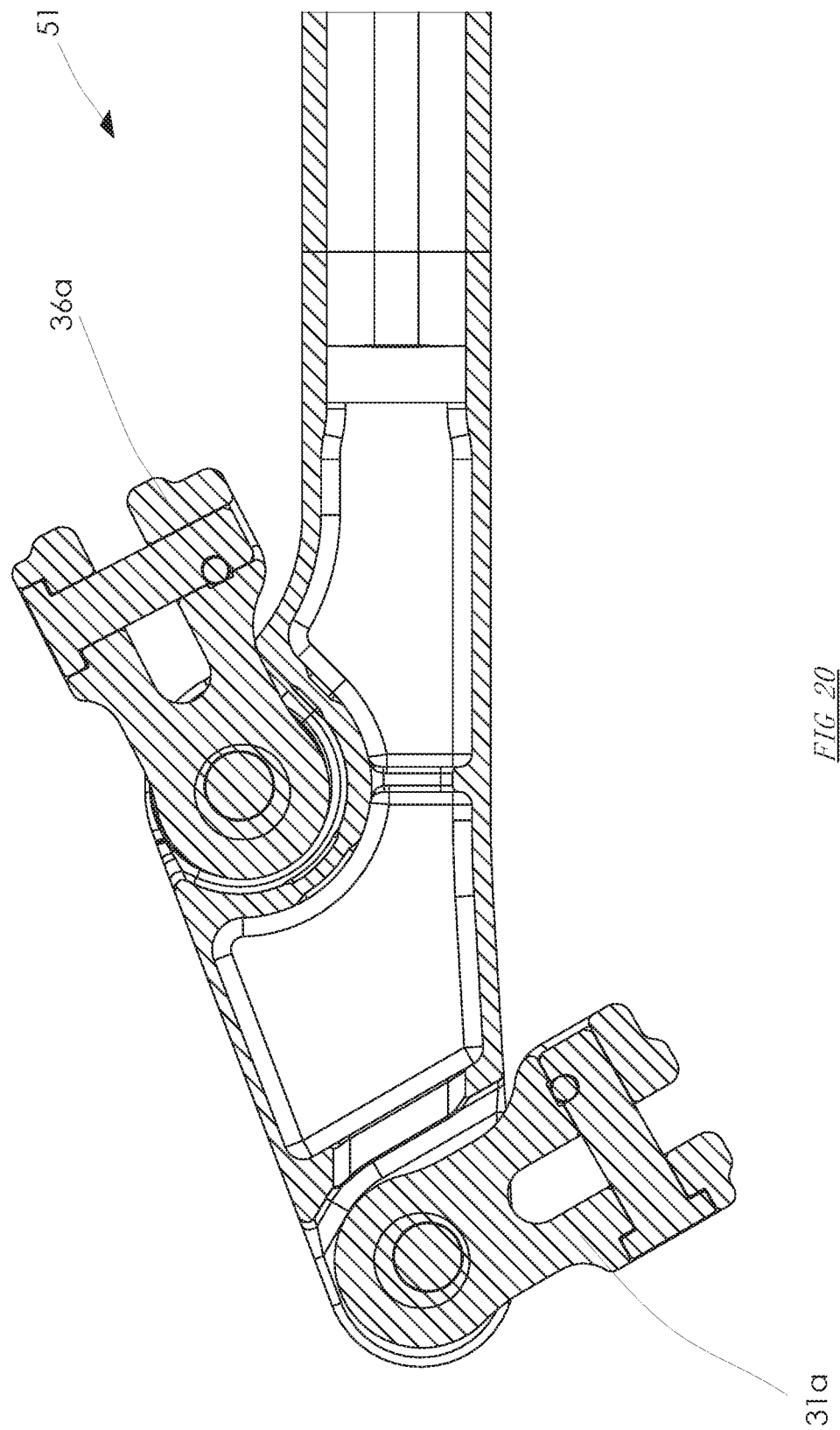

The inner end face 76 of the end pieces 51 and 53 which is more clearly illustrated in FIG. 15 is the same as the cross-sectional shape of the three interconnecting tube pieces or segments 54, 55 and 56 which provides for better welded joints. The shape of the interconnecting tube has been developed so as to provide greater efficiency in tensile strength especially in bending and high yield strength as well as resistance to impact failure over increased spans while avoiding large increases in mass. The end pieces and the tube segments are made in low alloy cast steel such as S520c (similar to AS2074-L6B) and has a yield strength of about 800 MPa.

As can be more clearly seen in FIG. 15 the cast tube 76 is formed by a continuous wall 77 defining an elongate hollow 78, comprising a lower wall portion 79, two spaced apart side wall portions 81 and 82 extending from said lower wall portion and contiguous therewith and an upper wall portion 83 spaced from said lower wall portion and contiguous therewith, said tube being generally symmetrical about a horizontal plane coplanar with and marked as centre line 84, a vertical plane 85 marked as centre line 85, and two orthogonal diagonal planes 86 and 87 through the tube, the wall increasing in thickness away from said vertical plane on both sides thereof towards said diagonal planes and decreasing in thickness from said diagonal planes towards said horizontal plane, the wall being thicker about the vertical plane through the bottom wall portion than through the upper wall portion and the upper wall portion being thicker about the vertical plane than the side walls about the horizontal plane and thicker about the diagonal planes between the bottom wall portion and the side wall portions than between the upper wall portion and the side wall portions, and the outer face of the portions of the wall about the diagonal planes being curved as can be seen at reference numbers 88 to 91. Advantageously, the curved outer face portions result in less damage to the tube if it happen to collide with the upper edge of the bucket or any other part of the bucket assembly.

It will be appreciated that the above description is by way of illustrative example only and all modifications and variations thereto as would be apparent to those of ordinary skill in the art are deemed to fall within the broad scope and ambit of the invention as defined by the appended claims.

What is claimed is:

1. A spreader bar including:
two spaced apart opposite end portions, and an intermediate connector portion connected to and extending between said opposite end portions, each end portion having a first connection point for connecting a lower hoist chain to the respective end portion and a second connection point for connecting an upper hoist chain thereto, said second connection point being spaced from said first connection point towards the opposite end portion by a predetermined distance, said predetermined distance being selected such that the upper hoist chain connected to the respective second connection point and extending upwards towards a predetermined center point above the center of the intermediate connector portion defines a larger inside angle with the longitudinal axis of the spreader bar than a line extending from the first connection point and to the same center point, and wherein a second line passing through the centers of the first and second connection points defines as a included angle between 10 degrees and 45 degrees with the longitudinal axis of the spreader bar.

2. A spreader bar including:
two spaced apart opposite end portions, each end portion having a first connection point for connecting a lower hoist chain thereto and a second connection point for connecting an upper hoist chain thereto, said second connection point being spaced from said first connection point towards the opposite end portion by a predetermined distance such that said first and second connection points are on a line which defines an angle with the longitudinal axis of the spreader bar that is greater than 10 degrees and less than 30 degrees.

3. The spreader bar according to claim 2, wherein each of said end portions has a predetermined length, said predetermined length being determined by the width of a top opening of a bucket to which the spreader bar is to be attached, wherein a distance between said first and second end portions is less than the width of the top opening of the bucket, and wherein the two spaced apart end portions will contact the respective upper edges of the side walls of the bucket in the event that the spreader bar falls onto the bucket in a generally horizontal position.

4. A spreader bar for hoisting a dragline bucket having a width defined by opposing side walls which form an upper opening in the bucket, the spreader bar including:
two spaced apart opposite end portions, each end portion having a first connection point for connecting a lower hoist chain to the respective end portions and a second connection point for connecting an upper hoist chain to the respective end portions, said first and second connection points being on a line which defines an included angle of greater than 10 degrees and less than 45 degrees with the longitudinal axis of the spreader bar;
said second connection point being spaced from said first connection point towards the opposite end portion by a predetermined distance, said predetermined distance being selected such that the upper hoist chains connected to the respective second connection points and extending upwards to a predetermined center point above the center of the width of the upper opening in the bucket, make a larger inside angle with the longitudinal axis of the spreader bar than would upper hoist chains connected to the respective first connection points; and said end portions having a predetermined length determined by reference to the width of the bucket to which the spreader bar is to be attached, wherein the first and second end portions are spaced apart a distance that is less than the width of the upper opening of the bucket, such that in an instance where the spreader bar descends onto the bucket during use, the two spaced apart end portions engage respective upper edges of the side walls of the bucket.

5. The spreader bar according to claim 4, wherein each end portion has a lower face which is substantially flat over at least the portion which directly contacts an upper edge of a sidewall of the bucket in the event that the spreader bar descends onto the bucket.

6. The spreader bar according to claim 5, wherein each said lower face has at least two flat portions.

7. The spreader bar according to claim 6, wherein one of said flat portions is substantially horizontal in use and another flat portion is inclined outwards and downwards from the horizontal portion.

8. The spreader bar according to claim 6, wherein said end portions are connected by an intermediate connector portion and wherein the length of each of said end portions is selected such that the length of the intermediate connector portion between the opposite end portions is at least 200 mm less than the width of the bucket with which the spreader bar is intended to be used.

9. The spreader bar according to claim 1, wherein a center of the first and second connection points are each above a lower face of the spreader bar.

10. The spreader bar according to claim 1 constructed of a material having high tensile strength, high yield strength and high hardness.

11. A spreader bar including:
two spaced apart opposite end portions joined by an intermediate connector portion, each end portion having a first connection point for connecting a lower hoist chain to the respective end portion and a second connection point for connecting an upper hoist chain thereto each said second connection point being spaced from said first connection point towards the opposite end portion by a predetermined distance, said predetermined distance being selected such that an upper hoist chain connected to the second connection point and extending to a center point above the center of the intermediate connector portion forms a greater included angle with the longitudinal axis of the spreader bar than a line passing through the center of the respective first connection point and extending through the same center point above the center of the intermediate connector portion.

12. The spreader bar of claim 1, wherein said first and second connection points lie on a line which defines an angle with the longitudinal axis of the spreader bar that is greater than 10 degrees and less than 30 degrees.

13. The spreader bar of claim 4, wherein said first and second connection points lie on a line which defines an angle with the longitudinal axis of the spreader bar that is greater than 10 degrees and less than 30 degrees.

14. A spreader bar including two spaced apart opposite end portions, each end portion having a first connection point for connecting a lower hoist chain thereto and a second connection point for connecting an upper hoist chain thereto, said second connection point being spaced from said first connection point towards the opposite end portion by a predetermined distance and said first and second connection points being on a line which defines an angle with the longitudinal axis of the spreader bar that is greater than 10 degrees and less than 45 degrees.

15. The spreader bar according to claim 14, wherein each of said end portions has a predetermined length, said predetermined length being determined by a width of a top opening of a bucket to which the spreader is to be attached, wherein a distance between said first and second end portions is less that the width of a top opening of a bucket which is configured for attachment to and below the spreader bar, and wherein the two spaced apart end portions will contact respective upper sidewall edges of the bucket in an instance where the spreader bar falls onto the bucket in a generally horizontal position.

* * * * *